Figure 2:
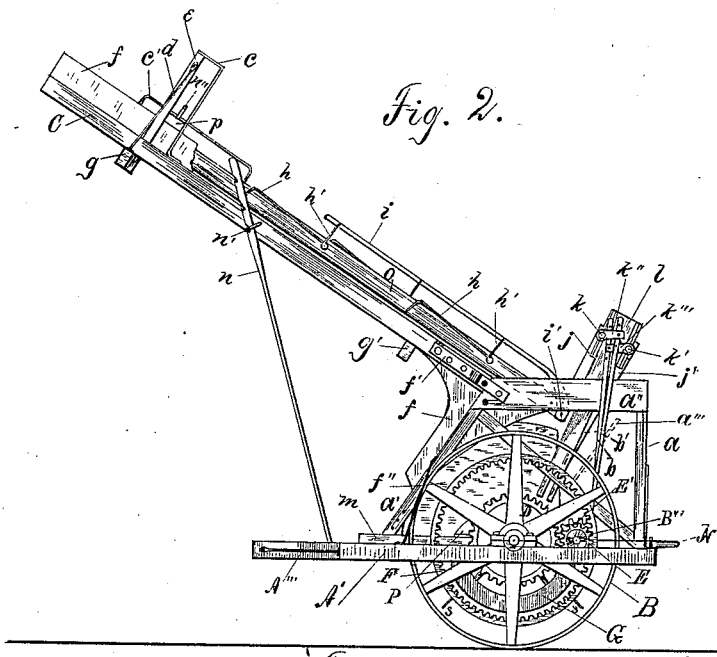

(No Model.)　　　　　　　　　　　　　　　　3 Sheets—Sheet 1.
C. P. SLAGHT.
HAY RAKE AND LOADER.

No. 334,093.　　　　　　　　　　Patented Jan. 12, 1886.

WITNESSES:　　　　　　　　　　　　　　INVENTOR
Wallace Greene　　　　　　　　　　　Charles P. Slaght
T. S. Wilson　　　　　　　　　　　　　BY
　　　　　　　　　　　　　　　　Robt. H. Wiles
　　　　　　　　　　　　　　　　　ATTORNEY (No Model.) 3 Sheets—Sheet 2.

C. P. SLAGHT.
HAY RAKE AND LOADER.

No. 334,093. Patented Jan. 12, 1886.

WITNESSES:
Wallace Greene
F. D. Wilcoxon

INVENTOR
Charles P. Slaght
BY
Robt. H. Wiles
ATTORNEY (No Model.)

3 Sheets—Sheet 3.

C. P. SLAGHT.
HAY RAKE AND LOADER.

No. 334,093. Patented Jan. 12, 1886.

WITNESSES:
G. H. Pattison
Wallace Greene

INVENTOR
Charles P. Slaght
BY
Robt. H. Wiles
ATTORNEY

UNITED STATES PATENT OFFICE.

CHARLES P. SLAGHT, OF TIFFIN, IOWA.

HAY RAKE AND LOADER.

SPECIFICATION forming part of Letters Patent No. 334,093, dated January 12, 1886.

Application filed January 14, 1884. Serial No. 117,304. (No model.)

*To all whom it may concern:*

Be it known that I, CHARLES P. SLAGHT, of Tiffin, in the county of Johnson and State of Iowa, have invented certain new and useful Improvements in Combined Hay Rakes and Loaders; and I do hereby declare the following to be a full, true, clear, and exact description of the invention, such as will enable others skilled in the art to which it pertains to make and use it, reference being had to the accompanying drawings, which constitute a part of this application.

The object of my invention is to produce a simple, practical, and efficient machine adapted to rake from the ground and load on the wagon to which the machine is attached the hay left by the mower.

There is a class of machines known as "hay-loaders," which take hay from the windrow into which it has been previously raked and place it on the load; but the machine shown in the drawings, and which embodies my invention, both rakes and loads the hay, taking it from the field as the mower leaves it.

The details of the invention are fully explained and described in this specification and shown in the accompanying drawings, in which—

Figure 1:
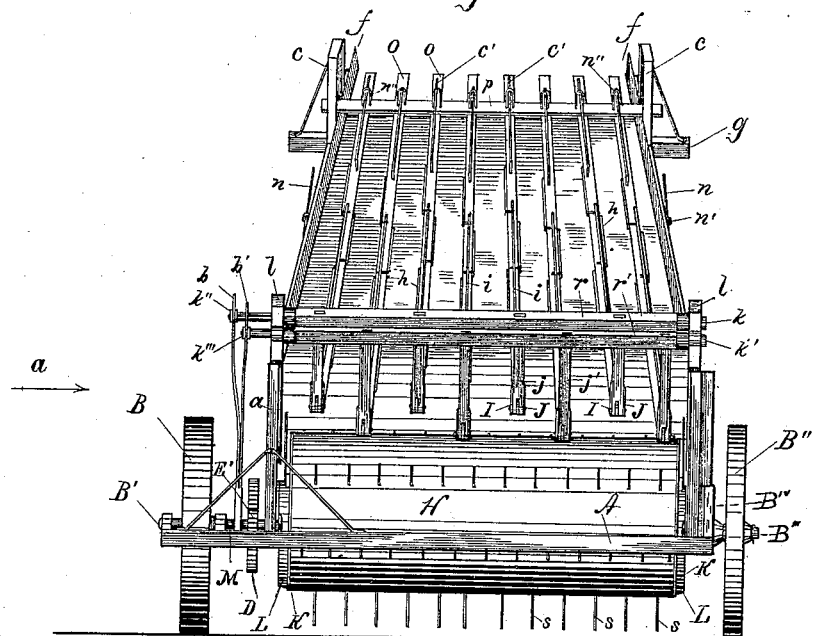
Figure 3:
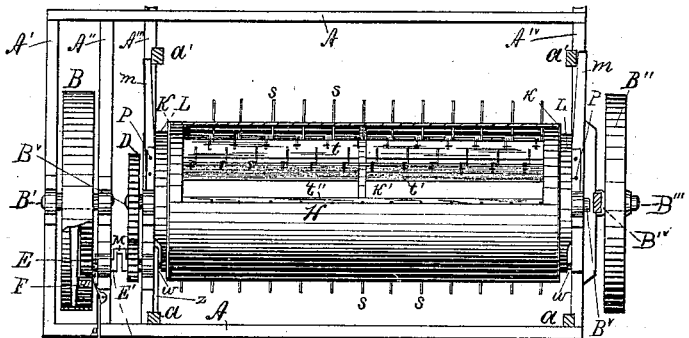
Figure 4:
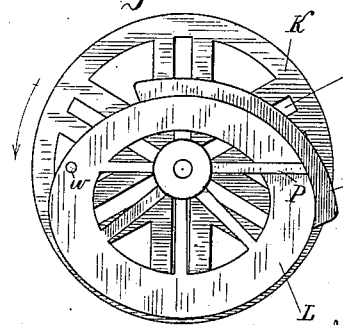
Figure 5:
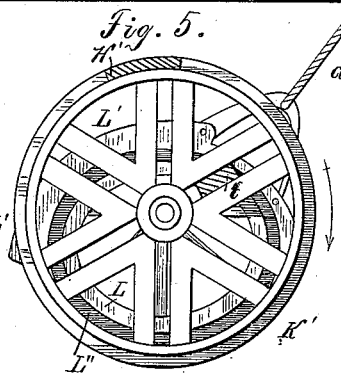
Figure 6:
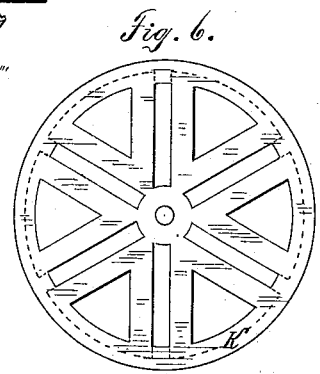
Figure 7:
Figure 8:
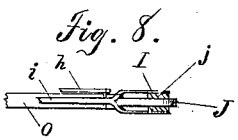
Figure 9:
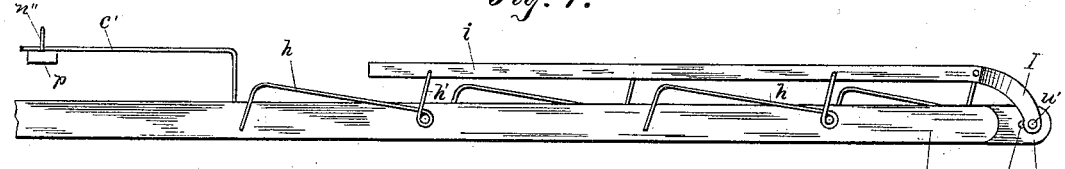
Figure 10:
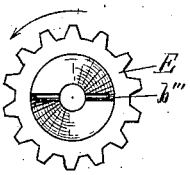
Figure 11:
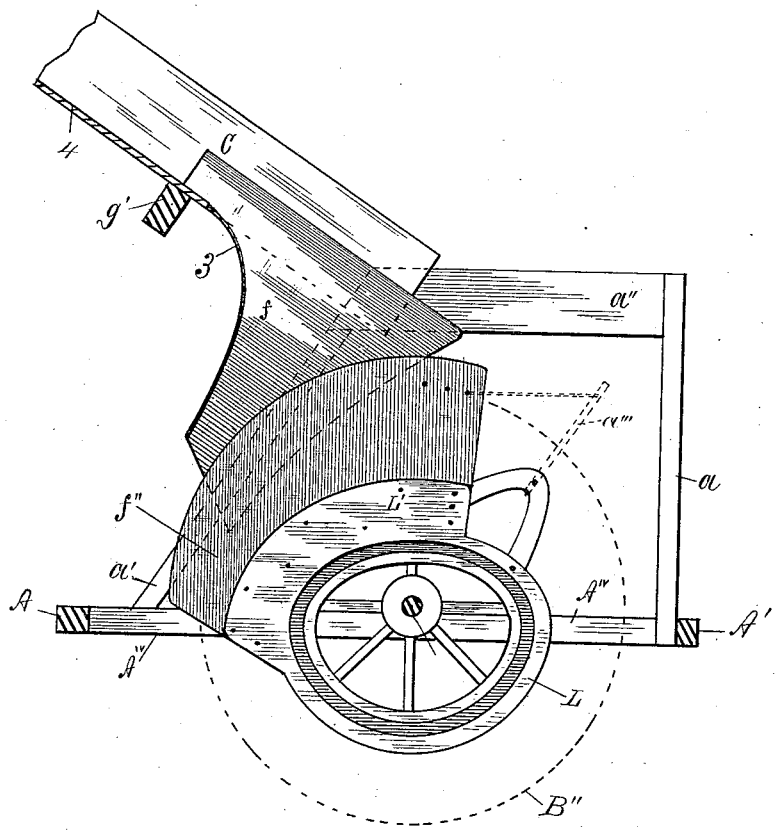

Figure 1 is a rear elevation of the machine, the stop-board $a'''$ being removed. Fig. 2 is a side elevation thereof looking in the direction indicated by the arrow $a$, Fig. 1. Fig. 3 is a plan view of the raking-cylinder, its supporting-frame and wheels, and the gearing connecting the wheels and the cylinder, a portion of the shell of the cylinder being removed to show the arrangement of the rake-heads within, and wheel B broken to show gear E. Fig. 4 is an external elevation of one of the radially-slotted cylinder-heads K and the cam L, lying in contact with the outer face thereof. Fig. 5 is an internal elevation of the same, showing a portion, H', of the cylinder-shell, the stop-board $a'''$, and one of the rake-heads $t$, in section. Fig. 6 is an external elevation of the cylinder-head K, the dotted lines indicating the form of a central cylinder-head placed midway between the ends of the cylinder. Fig. 7 is an elevation of one of the rake-heads $t$, with one spring-tooth in position thereon. Fig. 8 is a plan of the tenon J of one of the reciprocating carriers O, and the bifurcated end I of the adjusting-rod $i$, attached thereto, the oscillating lever $j$ being cut across just above its point of connection with the carrier and adjusting-rod, and shown in section. Fig. 9 is a side elevation of one of the carriers O and its adjusting-rod $i$. Fig. 10 is a side elevation of the pinion E and its shaft, (enlarged;) and Fig. 11 is an internal elevation of one of the cams L, its flange L', the shield $f''$, fastened to the flange and the side pieces of the elevator, the wheel and the position of the stop-board $a'''$ being indicated by dotted lines.

In these views A A are the front and rear timbers, and A' A" A''' $A^{IV}$ the cross-timbers of the rectangular main frame of the machine, the cross-timbers A''' $A^{IV}$ being extended forward from the front timber A of the main frame, and connected by a stick parallel with A A, thus forming a smaller supplemental rectangle, the front of which is adapted to be attached to a wagon. (See Fig. 3, in which the main frame is shown with timbers A''' $A^{IV}$ broken off in front of the front timber A, and Fig. 2, in which the entire frame is shown in side elevation.) The frame is supported by two wheels, B B", the wheel B being placed between the cross-timbers A' A", while the wheel B" is outside of the timber $A^{IV}$. The shaft B' of the wheel B is journaled and turns freely in suitable boxes attached to the upper faces of the cross-timbers A' A", and the wheel B" is mounted and turns on a stud-axle, B''', formed integrally with a suitable casting, $B^{IV}$, which is rigidly fastened to the frame of the machine. The wheel B" has no function except that of a support for the frame and a means of moving the machine; but the wheel B is provided with an internally-geared ring, F, bolted to the inner faces of its spokes, and adapting it to drive the machine, as is hereinafter set forth.

Between the cross-timbers A''' $A^{IV}$ hangs a hollow raking-cylinder, H, rigidly mounted on an axial shaft, $B^V$, whose ends are journaled in suitable boxes in two cams, L L, placed outside the cylinder and at opposite ends thereof. Each of the cams L has formed on its outer face a horizontal flange, P, to the lower face of which is bolted a forward-extending lever, $m$, (see Figs. 2, 3, 4,) and on the outer face of each cam is an integrally-formed pin, $w$, in rear of the central shaft-box, and in the plane of the flange P, said pins $w$ being pivoted in the inner faces of the cross-timbers $A'''$ $A^{IV}$, respectively, or in suitable bearings rigidly attached to said cross-timbers. The front ends of the levers $m$ may be raised above the cross-timbers $A'''$ $A^{IV}$, on which they ordinarily rest, thus raising the shaft $B^V$ of the raking cylinder; and when said levers are so raised they are secured and held in position by means of pins entering a series of holes in the oblique front timbers, $a'$, of the vertical end frames of the machine. (See Fig. 2.) On the shaft $B^V$, just within the cams L L, are rigidly mounted two cylinder-heads, K K, Figs. 4, 5, 6, each consisting of a central hub encircling the shaft, a series of radially-slotted arms (preferably six in number) extending outward from the hub, and a rim formed integrally with the outer ends of the arms, and provided on its inner face with an annular flange adapted to receive the planking or shell of the cylinder. The cylinder-shell is attached as shown in Fig. 5, (in which one of the planks $H'$ thereof is shown in section,) and I have found it best to stiffen the shell by means of a central head, $K'$, Fig. 3, whose form is indicated by dotted lines on Fig. 6, and is substantially the same as that of the heads K, except that the radial slots in the arms of the head $K'$ extend to the circumference of the head, and the circumference, instead of being flush with the outer surface of the planking $H'$, is in contact with the inner surface thereof.

On the end of the shaft $B^V$, and between the cross-timbers $A''$ $A'''$, is rigidly mounted a spur-gear, D, which engages with a pinion, $E'$, rigidly mounted on a cranked shaft, $B^{VI}$, journaled in suitable boxes, and having its axis coincident with the axis of the pins $w$ $w$, on which the cams L L are pivoted. The boxes of the shaft $B^{VI}$ are attached to the cross-timbers $A''$ $A'''$, respectively, and the shaft extends outward beyond the box on the timber $A''$ a sufficient distance to receive a pinion, E, Figs. 2 and 3, loosely mounted on the shaft, and engaging with the geared ring F, already mentioned as attached to the spokes of the wheel B. On the outer face of the pinion E are formed two symmetrical ratchet-teeth, each having one of its faces abrupt and the other face an inclined spiral; and each of the spiral faces extends from the base of one of said teeth to the point of the other. (See Figs. 2, 10.) A pin, $b'''$, Fig. 10, passes through the outer end of the shaft $B^{VI}$, and engages with the ratchet-teeth, the outer face of the pinion being held in contact with the pin by means of a spring-lever, N, Figs. 2, 3, pivoted at its center to the cross-timber $A''$, and held in position by a pin, $w'$, set in the rear timber, A, of the main frame. The rotation of the drive-wheel B with its geared ring F rotates the pinion E, and the operation of the pin $b'''$ and the ratchet-teeth of the pinion is such that when the machine moves forward and turns the pinion in the direction indicated by the arrow in Fig. 10 it turns the shaft $B^{VI}$ and pinion $E'$ in the same direction, and communicates reverse motion to the spur-gear D, shaft $B^V$, and raking-cylinder H, while the reverse rotation of the drive-wheel B and pinion E simply causes the pin $b'''$ to slip over the inclined faces of the ratchet-teeth, and does not rotate the shaft $B^{VI}$ or turn the raking-cylinder. The inner end of the lever N lies in a groove between the rear face of the pinion E and a collar formed integrally with the pinion. If the pin $w'$ be taken out of its socket and the free end of the lever N be moved outward or away from the raking-cylinder, the opposite end of the lever will be moved inward and will carry the ratchet-teeth of the pinion E wholly out of engagement with the pin $b'''$, thus permitting the drive-wheel B and pinion E to rotate in either direction without turning the cylinder H. Within the cylinder H are a series of horizontal rake-heads, $t$, corresponding in number to the slotted arms of the heads K K of the cylinder. Each end of each rake-head is protected by a metal clasp or guard, $t'$, Fig. 7, and on each guard is an integrally-formed pin, $t''$. Each head lies in the corresponding slots of the three heads K K $K'$, and all the pins $t''$ project through the slots of the heads K K and enter the grooves $L''$ in the inner faces of the two cams L. As the machine moves forward in the working direction the cylinder-heads turn in the direction indicated by the arrows in Figs. 4 and 5. The rake-heads, lying in the radial slots of the heads, necessarily rotate with them, and each of the pins $t''$ is carried about the shaft and follows the course of the groove $L''$, in which it lies. The cam-groove is eccentric, the lower half being very nearly a semi circumference, and considerably farther from the axis of the cylinder than the upper half, which is not an arc of a circle. It is evident that as each pin follows the groove $L''$ its distance from the shaft $B^V$ or from the shell $H'$ must vary by an amount equal to the eccentricity of the groove, and of course the distance of the rake-heads from the shell must vary in the same way and to the same extent as that of the pins $t''$. Each of the rake-heads $t$ is provided with a series of spring rake-teeth, $s$, Figs. 1, 3, 7, each formed of a single spring-rod, one end of which is fastened to the head, while the other end projects from the head at right angles thereto. A coil, $s'$, is formed from each of the rods at any desired point between its ends, (but preferably just at the edge of the head, as shown in Fig. 7,) and gives elasticity to the tooth. In the shell of the cylinder are six sets of transverse slots, one set corresponding to the teeth of each of the rake-heads, and the length of each of the slots being such as to permit the springing of the teeth when obstructed in their motion. The length of all the teeth is the same, and is such that when either of the rake-heads is at its greatest distance from the axis of the cylinder the points of its teeth are somewhat nearer than the periphery of the wheel B to the axis. In other words, when the rake-head is at its lowest position, the ends of its teeth are a short distance above the ground on which the wheels rest. The eccentricity of the groove L'' is such that when the rake-head reaches its greatest distance from the shell the points of its teeth are slightly within the outer surface thereof, and within and protected by the slots in which they move. Thus during about half of its rotation about the axis of the cylinder each tooth projects through the shell sufficiently to very nearly reach the ground when immediately below the axis, while in the remainder of its rotation it is more or less wholly withdrawn within the cylinder, and when immediately above the axis is completely hidden therein.

On each of the cross-timbers A''' A$^{IV}$ is fastened a suitably-braced vertical frame-work, already referred to, and consisting, as shown, of a vertical rear post, $a$, an oblique front post, $a'$, a horizontal cross-bar, $a''$, and suitable braces, and the rear end of an elevator, C, is fastened to the front ends of the cross-bars $a''$ by means of clasps $f'$, attached to the elevator and bolted or pinned to the cross-bars. The positions of the connecting-bolts may be changed both in the clasps $f'$ and the cross-bars $a''$, (see Fig. 2,) for the purpose of affording vertical and longitudinal adjustment of the rear of the elevator, and the front end is supported by brace-rods $n$, fastened at the bottom to the main frame of the machine, and provided at the top with notches, which engage with loops $n'$ on the sides of the elevator. Each of the brace-rods has a number of notches adapted to engage with the corresponding loop $n'$, and the height of the front end of the elevator may be varied at will.

The elevator consists of a bottom and two side pieces, $f$, and is somewhat narrower at its upper front end than at the rear, in order that as hay passes upward and forward it may be compressed between the side pieces. At its rear end the bottom curves downward, forming an apron to receive the hay from the cylinder, and to prevent it from falling in front of the machine before being caught by the carrying mechanism; and the side pieces, $f$, follow the downward curve of the apron, and extend back sufficiently to overlap two shields, $f'''$, fastened to vertical flanges L' on the upper margins of the cams L. (See Fig. 2.) Near the front end of the elevator, and on opposite sides thereof, are fastened to the side pieces, $f$, two transversely-slotted posts, $e$; and a bar, $p$, lies across the elevator, resting on the side pieces, and passing through the slots in the posts $e$. In the upper face of the bar $p$ are set a series of staples, $n''$, and in each staple slides longitudinally a guide-rod, $c'$, parallel with a reciprocating carrier, O, and rigidly fastened to the upper surface thereof near its front end. Each of the carriers is supported at the rear end by a bolt, $u'$, passing through a longitudinal slot, $u$, in the carrier, (see Fig. 9,) and through the lower end of one of the oscillating levers $j$ $j'$, Figs. 1, 2, 8; and the levers $j$ are rigidly fastened at the top to a horizontal rock-shaft, K, while the levers $j'$ are similarly fastened to a second rock-shaft, K'. The two rock-shafts are journaled at both ends in vertically-adjustable posts $l$, Figs. 1, 2, and are provided with cranks K'' K''', respectively, which extend in opposite directions from the rock-shafts, and are placed as nearly as possible over the crank M in the shaft B$^{VI}$, Fig. 3. Two pitmen, $b$ $b'$, connect the crank M with the cranks K'' K''', respectively, and thus each rotation of the crank M rocks the shafts K K' in opposite directions, and thereby imparts reverse oscillation to the levers $j$ $j'$, and reverse reciprocal motion to the carriers O. On the sides of the carriers O are pivoted a series of bell-crank levers, each consisting of a horizontal member, $h$, and a vertical member, $h'$. The front end of the horizontal member is bent downward to form a tooth, and the upper end of the vertical member is bent at right angles, to form a transverse horizontal crank-pin; and all the crank-pins of the levers fastened to each carrier are pivoted in an adjusting-rod, $i$, lying above and parallel to the carrier. The rear end of the adjusting-rod is bent downward and divided, the two parts lying on opposite sides of a tenon, J, at the rear end of the carrier; and the same bolt which passes through the slot $u$ in the carrier, and through the bottom of the corresponding lever, $j$ or $j'$, passes through a hole in the rear end of the adjusting-rod. (See Fig. 9.) The result of this arrangement of the parts is that at the beginning of the forward movement of one of the levers $j$ $j'$ the connecting-bolt $u'$ moves forward in the slot $u$, carrying with it the adjusting rod $i$, but not moving the carrier O until it has passed through the entire length of the slot. This independent forward movement of the adjusting-rod rocks the bell-crank levers on their pivots and throws the teeth downward below the lower face of the carrier, and the teeth remain in this position during the entire forward movement of the carrier. When the carrier reaches its highest point and the lever $j$ begins its backward movement, the bolt $u'$ again traverses the slot $u$ before moving the carrier O; and this independent movement rocks the bell-crank levers backward, and raises the teeth above the lower face of the carrier into the position shown in Fig. 9, a position which they retain during the backward movement of the carrier.

It is evident that of the two sets of levers $j$ $j'$ one must always be swinging forward and the other backward, and that consequently one half of the carriers O must be moving toward the front, and the other half toward the rear, of the elevator; and from the foregoing description of the adjusting-rods $i$ and levers $h$ $h'$ it is also evident that the teeth of the forward-moving carriers must force forward any hay lying in the elevator; that before beginning their backward motion the teeth are elevated and freed from the hay, and that the backward-moving carriers offer no resistance to the motion imparted to the hay by the other carriers.

Each of the guide-rods $c'$ has a slight amount of vertical play in the staple $u''$, and the transverse bar $p$ has sufficient vertical play in the slotted posts $e$ to permit its adjustment to the passage of any desired quantity of hay. Above the cylinder H, and slightly in rear of the axis thereof, is a stop-board, $a'''$, Fig. 2, pivoted at the lower edge to arms projecting upward from the cams L, and held in place by brace-rods extending from its upper edge to the guards $f''$. Each of the guards is pierced by a series of holes for varying the point of connection of the front end of the corresponding brace-rod, and thus swinging the upper end of the stop-board back or forward. The lower edge of the stop-board thus remains stationary, while the upper edge has an oscillating adjustment about the line of the pivots which connect the stop-board with the cams L. The office of the stop-board is to arrest any loose hay which might otherwise pass completely around the cylinder and drop behind the machine; and the hay so stopped is piled up in front of the board until it falls forward into the carrying mechanism and is elevated with the remainder of the hay to the wagon in front. (For connection of stop-board and cam L see Fig. 5.)

From the foregoing description and explanation of the parts of the machine it appears that as the machine moves forward the lower half of the raking-cylinder moves from rear to front;
that as the cylinder turns the rake-heads move in and out with reference to the axis; that the teeth of the rake-heads when below the axis project outward from the shell and rake forward and upward any hay on the ground passed over, but are drawn into the cylinder and freed from the hay as soon as it is brought above the axis of the cylinder; that the hay raised by the rake-teeth is caught between the cylinder and the apron of the elevator and brought within the reach of the teeth of the reciprocating carriers O, and is by them carried forward and upward along the bed of the elevator; that it is compressed as it goes forward and upward by the convergence of the sides of the elevator, and is finally dropped from the front end of the elevator to the wagon in front thereof.

It is evident that many of the parts of the machine may be varied in form without changing their functions or materially changing their operation, and also that certain elements of the machine may be wholly changed without affecting the operation of the remaining elements. Thus the carriers O and the parts connected with them may be replaced by an endless-chain carrier of any well-known construction, and the carrier so substituted will work perfectly with the raking-cylinder and the parts immediately connected therewith; and, again, the form of the cams L may be changed by substituting a flange for the groove $L''$, and the pin $t''$ replaced by a pair of pins or rollers embracing the cam-flange, or the arms of the heads K, instead of being slotted, may be single arms, passing through, instead of inclosing, the rake-heads $t$. In fact, the cams L may be replaced by any other mechanism adapted to give the desired eccentric motion to the rake-heads, and the principle of operation of the raking mechanism will still remain the same. I do not intend therefore, to limit my invention to the combination of any or all of the elements shown and described in the exact forms in which they appear in this machine.

I am aware that the combination, in a hay rake and loader, of a rotating hollow cylinder, and a series of rake-teeth rotating with the cylinder and adapted to be alternately projected from and retracted within the same, is not new, and that the combination of a hollow cylinder rotating in a direction opposite to the direction of rotation of the supporting-wheels of the machine, and a series of rake-teeth pivoted at fixed points within the shell of the cylinder and adapted to be alternately projected from and retracted within the shell, is shown in a prior patent. So far as I know, however, no machine of this class has heretofore been patented or put in use in which the raking-cylinder turned in the direction opposite to the direction of rotation of the supporting-wheels, and the rake-teeth were mounted on or fastened to rake-heads adapted to vary their distance from the axis of the cylinder, and thus move the teeth in or out from the axis. I do not therefore desire to cover by the claims hereof either of the combinations whose lack of novelty has been admitted; but, Having described my invention and explained its operation, what I claim as new, and desire to secure by Letters Patent, is—

1. The combination of the wheel $B''$ and drive-wheel B, the main frame of the machine supported by said wheels, the heads K K, shaft $B^V$, and shell $H'$, the cams L L, pivoted at their rear margins to the main frame, and the levers $m$, attached to said cams and adapted to raise them and elevate the cylinder, the spring-teeth $s$, and rake-heads $t$, whose ends project through the slots in the heads K K into the cams L L, and the gears D E E' F connecting the drive-wheel and the shaft $B^V$, substantially as shown and described, and for the purpose set forth.

2. The combination of the shaft $B^{VI}$, the pin $b'''$, passing through the outer end of said shaft, the drive-wheel B, and geared ring F, attached to the drive-wheel, and the pinion E, loosely mounted on the shaft $B^{VI}$ and engaging with the guard-ring F, said pinion having ratchet-teeth on its outer face engaging with the pin $b'''$, substantially as shown and described, whereby the rotation of the wheel B in one direction rotates the shaft $B^{VI}$, while the reverse rotation of the wheel B rotates the pinion E without affecting the shaft $B^{VI}$.

3. In a hay rake and loader, the combination of a suitably-suspended hollow raking-cylinder, a series of raking-teeth rotating with said cylinder and adapted to vary their position with reference to the axis thereof, a cam or cams pivoted to the frame of the machine and adjustable in relation thereto, and means connecting said raking-teeth and said cams, whereby as the cylinder rotates the position of the raking-teeth with reference to the axis of the cylinder is varied by the cams.

4. In a hay rake and loader, the combination of a hollow raking-cylinder suspended on the frame of the machine, a series of rake-heads suspended within the cylinder and rotating therewith, but projecting beyond the ends thereof, suitable raking-teeth attached to said rake-heads and adapted to project outside the cylinder, and a cam or cams pivoted to the frame of the machine and adjustable in relation thereto, adapted to engage with the projecting ends of said rake-heads and guide them in a path eccentric to the axis of the cylinder as they rotate about said axis, whereby said rake-teeth during a part of each rotation of the cylinder project outside the periphery thereof, and during the remainder of such rotation lie within the same, substantially as shown and described, and for the purpose set forth.

5. The combination of the wheels B B'', the main frame of the machine supported on said wheels, the raking-cylinder, raking-heads, and raking-teeth, and means, substantially as shown and described, for operating the same, the inclined elevator C, attached to the main frame of the machine, the reciprocating carriers O, adjustable toothed levers $h\ h'$, pivoted to said carriers, means for imparting longitudinal reciprocal motion to said carriers, and means for depressing the teeth of the levers $h\ h'$ before each forward movement of the carriers, and for elevating said teeth before each backward movement thereof, substantially as shown and described, and for the purpose set forth.

6. The combination of the elevator C, cross-bar $p$, carriers O, supported by said cross-bar, levers $h\ h'$, adjusting-rods $i$, swinging levers $j\ j'$, bolts $u'$, connecting the carriers, adjusting-rods, and swinging levers, the rock-shafts K K', pitmen $b\ b'$, cranks K'' K''', and crank M, all combined and operating substantially as and for the purpose set forth.

7. The combination of the cylinder H, rake-heads $t$, and teeth $s$, attached thereto, means, substantially as shown and described, for operating said rake heads and teeth, a stop-board above said cylinder adapted to prevent the carrying of hay completely around the cylinder, and means, substantially as shown and described, for taking hay from said rake-teeth and elevating it in front of the raking mechanism.

8. The combination, with the raking-cylinder, and means, substantially as shown and described, for operating the same, of the stop-board $a'''$ above said cylinder, pivots connecting the lower edge of said stop-board with supports stationary with reference to the cylinder, and means, substantially as shown and described, for moving the upper edge of the stop-board backward or forward, thereby giving it an oscillating adjustment about the pivot at its lower edge, substantially as shown and described, and for the purpose set forth.

9. The combination of the elevator C, slotted posts $e$, cross-bar $p$, staples $n''$, guide-rods $c'$, sliding in said staples, the carriers O, and rocking levers $h\ h'$, attached thereto, the adjusting-rods $i$, bolts $u'$, passing through holes in the rear ends of the adjusting-rods and through slots $u$ in the rear ends of the carriers, the oscillating levers $j\ j'$, connected with the carriers by said bolts $u'$, the rock-shafts K K', and means, substantially as shown and described, for rocking the two shafts in reverse directions, substantially as shown and described, and for the purpose set forth.

10. The combination of the cams L L, the vertical flanges L', formed integrally therewith, the shields $f''$, attached to said flanges, the elevator C, provided with a bed curved downward at its rear end to form an apron, and the side pieces, $f$, following the downward curve of the bed and extending back to join the shields $f''$, substantially as shown and described, and for the purpose set forth.

CHARLES P. SLAGHT.

Witnesses:
 ED CRAIG,
 M. A. DRAKE.